US011360332B2

(12) United States Patent
Dubail et al.

(10) Patent No.: US 11,360,332 B2
(45) Date of Patent: Jun. 14, 2022

(54) METHOD FOR FILTER SELECTION (71) Applicant: Essilor International, Charenton-le-Pont (FR)

(72) Inventors: Marie Dubail, Charenton-le-Pont (FR); Sophie Jost, Vaulx-en-Velin (FR); Coralie Cauwerts, Vaulx-en-Velin (FR)

(73) Assignee: Essilor International, Charenton-le-Pont (FR)

( * ) Notice: Subject to any disclaimer, the term of this patent is extended or adjusted under 35 U.S.C. 154(b) by 207 days.

(21) Appl. No.: 16/627,691

(22) PCT Filed: Jun. 27, 2018

(86) PCT No.: PCT/EP2018/067332
§ 371 (c)(1),
(2) Date: Dec. 30, 2019

(87) PCT Pub. No.: WO2019/002416
PCT Pub. Date: Jan. 3, 2019

(65) Prior Publication Data
US 2020/0166780 A1 May 28, 2020

(30) Foreign Application Priority Data
Jun. 30, 2017 (EP) ..................... 17305842

(51) Int. Cl.
*G02C 7/02* (2006.01)
*G02C 7/10* (2006.01)
(52) U.S. Cl.
CPC ............. *G02C 7/104* (2013.01); *G02C 7/027* (2013.01); *G02C 7/10* (2013.01); *G02C 7/101* (2013.01); *G02C 7/022* (2013.01)

(58) Field of Classification Search
CPC .......... G02C 7/024; G02C 7/10; G02C 7/104; G02C 7/022; G02C 7/027; G02C 7/083;
(Continued)

(56) References Cited

U.S. PATENT DOCUMENTS

2016/0070105 A1* 3/2016 Tannoudiji ......... G02B 27/0172
345/8
2017/0038605 A1* 2/2017 Legerton ................ G02C 7/101
(Continued)

FOREIGN PATENT DOCUMENTS

CN       105164576     12/2015
WO    WO 2001/057583    8/2001
(Continued)

OTHER PUBLICATIONS

International Search Report and Written Opinion Issued in Corresponding PCT Patent Application No. PCT/EP2018/067332, dated Sep. 24, 2018.

*Primary Examiner* — Jordan M Schwartz
(74) *Attorney, Agent, or Firm* — Norton Rose Fulbright US LLP (57) ABSTRACT

The present invention relates to a method implemented by computer means of selecting an optical filtration of an ophthalmic device for a wearer, the method comprising: —obtaining wearer's preferences relatively to at least one predetermined type of visual environment comprising multispectral or hyper spectral data; —selecting at least one filter: —corresponding to said wearer's preferences relatively to said at least one predetermined type of visual environment, and —determined on the basis of said multispectral or hyper spectral data.

13 Claims, 10 Drawing Sheets (58) Field of Classification Search
CPC .... G02C 7/101; G02C 7/102; G02B 27/0172; G02B 27/0101; G02B 2027/0178; G02B 2027/0138
See application file for complete search history.

(56) References Cited

U.S. PATENT DOCUMENTS

| | | | | |
|---|---|---|---|---|
| 2017/0160440 A1* | 6/2017 | Yadin | .................... | G02B 3/0081 |
| 2017/0272737 A1* | 9/2017 | Jacobs | .................. | G02B 27/017 |
| 2017/0315384 A1* | 11/2017 | Saylor | ..................... | G02C 7/104 |
| 2017/0371179 A1* | 12/2017 | Scherlen | ................ | G02C 7/027 |
| 2018/0011360 A1* | 1/2018 | Barrau | .................... | G02C 7/101 |
| 2018/0164608 A1* | 6/2018 | Schmeder | .............. | G02B 5/223 |

FOREIGN PATENT DOCUMENTS

| | | |
|---|---|---|
| WO | WO 2014/174067 | 10/2014 |
| WO | WO 2016/077431 | 5/2016 |
| WO | WO 2016/107904 | 7/2016 |
| WO | WO 2016/113506 | 7/2016 |

\* cited by examiner

METHOD FOR FILTER SELECTION

CROSS-REFERENCE TO RELATED APPLICATIONS

This application is a national phase application under 35 U.S.C. § 371 of International Application No. PCT/EP2018/067332 filed 27 Jun. 2018, which claims priority to European Patent Application No. 17305842.1 filed 30 Jun. 2017. The entire contents of each of the above-referenced disclosures is specifically incorporated by reference herein without disclaimer.

BACKGROUND OF THE INVENTION

The present invention relates to optical filtration, and more specifically to a method of selecting an optical filtration of an ophthalmic device for a wearer in a visual environment.

As a general rule, the choice to purchase an ophthalmic device such as spectacles for instance tends to be based on esthetic and fashion trend. Rarely wearers decide to invest in an ophthalmic device taking into account the color of a lens or any type of filter applied.

In the case of an ophthalmic device comprising a solar lens, wearers would rather base their buying choices on the design of the frame of the ophthalmic device rather than the solar filter applied.

Every wearer possesses different visual and physiological characteristics. Moreover, as every wearer is different, they may practice different activities. Such activity practice may vary in intensity and occurrence according to the wearer. For instance, on one hand, some wearer may spend most of their time indoor due to working constraint and on the other hand, some wearers may allocate their time to outdoor activities.

As a consequence, such parameters as wearers' activities, preferences and characteristics may impact significantly the filter wearers may need and prefer. Furthermore, such parameters may also influence the evaluation of the benefits of the filter made by wearers. For instance, a wearer with an advanced age that may mostly work on a computer screen may require and appreciate a different filter from a young wearer practicing sports outdoor.

Consequently, in order to provide a filter that may suits best a wearer, the knowledge regarding the wearer habits and preferences may be necessary. For this purpose, data relating to the environment of the wearer may provide excellent information to select a filter adapted to the wearer.

Numerous ophthalmic devices comprising solar lens may be designed for dedicated activities. For instance, an ophthalmic device comprising a solar lens adapted to practice ski. However, such solar lens or filters applied are based on theoretical data.

Therefore, such solutions have drawbacks. Indeed, as such ophthalmic device are based on theoretical data, they may not be adapted to wearer's activities, preferences and characteristics.

Therefore there is a need to select a personalized filter, according to the habits, the environments, the preferences and the spectral sensitivity of the wearer. Such necessity may be express in a need for a method of selecting an optical filtration of an ophthalmic device for a wearer that takes into account wearer's preferences relatively to visual environments.

The present invention aims to improve the situation.

SUMMARY OF THE INVENTION

The invention relates to a method implemented by computer means of selecting an optical filtration of an ophthalmic device for a wearer, the method comprising:
   obtaining wearer's preferences relatively to at least one predetermined type of visual environment comprising multispectral or hyper spectral data;
   selecting at least one filter:
   corresponding to said wearer's preferences relatively to said at least one predetermined type of visual environment, and
   determined on the basis of said multispectral or hyper spectral data.

It is meant by "multispectral or hyper spectral data" a set of data within specific wavelength ranges across the electromagnetic spectrum. It may be considered that multispectral data relates to at least three spectral bands up to fifteen spectral bands. Hyper spectral data may be considered to relate to hundreds of contiguous spectral bands.

A "visual environment" designates any type of environment; examples may be a forest environment, an office environment, driving in day or night conditions. The visual environment may be indifferently designed here as a scene.

The optical filtration method may result to any type of lens. For example, it may result to a solar lens or any other type of lens that are not necessarily solar lens.

With such a method, the use of multispectral or hyper spectral data enables a quick acquisition of spectral information at each point of a visual environment. Such method relieves from constraints that relate to color gamut of the acquisition equipment. Obtaining multispectral data or hyper spectral data permits to take into account visual phenomena such as color constancy and metamerism. Spectral transmissivity of a tinted lens for example may be directly applied to the acquired spectral distributions. It may also be possible to classify and quantify filters according to several criteria. Such criteria may relate to hue distortion, chroma/saturation enhancement, or to luminance/color contrast enhancement.

In an embodiment, the selecting of at least one filter takes into account the spectral sensitivity of the wearer.

In an embodiment where the ophthalmic device comprises an electrically commanded cell, the method further comprises commanding said electrically commanded cell to apply said selected filter.

Therefore, the filter can be applied dynamically according to the visual environment surrounding the wearer. The use of an electrically commanded cell provides flexibility for the wearer. Indeed, the wearer may not need several ophthalmic devices with different filters applied.

In an embodiment, the method further comprises:
   generating images representing said at least one predetermined type of visual environment of the wearer with said at least one filter applied;
   receiving a wearer input to validate based on said generated images said at least one filter selected.

Therefore, the wearer is provided with images that simulate the effect of different filters on visual environments. The wearer may then be able to select filters among the different filters according to criteria that may be for example preference and performance.

In an embodiment the generated images are displayed on a RGB color display, and the generated images are further based on spectral transmission of said at least one filter applied and on said multispectral or hyper spectral data.

In an embodiment the wearer's preference are obtained by at least one sensor configured to sense environment light signal.

Therefore, the sensor is able to capture the visual environment of the wearer. For this reason spectral reflectance of the objects surrounding the wearer and the spectral radiance of the light of the visual environment of the wearer may be taken into account.

In an embodiment, the at least one sensor configured to sense environment light signal is embedded in an external device or in the ophthalmic device.

Therefore, having a sensor embedded for example on a frame of the ophthalmic device or on a mobile device or on a connected watch enables to capture rather wide field of views. Moreover, it provides information relating to the different visual environment where the wearer finds himself in. As a result a list of visual environments the wearer regularly experiences along with multispectral or hyper spectral data associated may be created.

In an embodiment, the said at least one sensor comprises a camera and said selecting of the at least one filter comprises a predetermined pattern recognition and a selection of an adapted filtration to be applied to images acquired by the camera comprising said predetermined pattern.

Therefore, the selecting of filter may be determined using partially the visual environment of the wearer, that is to say, object of interest or specific pattern of the visual environment of the wearer. Example of object of interest and specific pattern may comprise pavement when the wearer walks in the street, human skin, computer screen light or roadway for instance.

In an embodiment, the obtained wearer's preferences are obtained in real time.

Therefore, a filter selection that suits best the visual environment in real time of the wearer may be performed. Moreover, in the case of the ophthalmic device comprising an electrically commanded cell that applies the selected filter, the wearer may enjoy a filter change in real time according to the change of his visual environment. For instance, a specific filter may be applied to a wearer that is driving and a different filter may be applied once the wearer stops driving and enters an outdoor visual environment.

In an embodiment, the ophthalmic device comprises a connection to a user interface, wherein said wearer's preferences comprise data inputted by the wearer through said user interface when the wearer wears the ophthalmic device and is within a learning visual environment, and wherein said obtaining wearer's preferences comprises:

according to said learning visual environment, commanding the cell to apply a predetermined filter, activating said user interface to receive from the wearer a choice input of keeping or adjusting the predetermined filter, if said choice input is to keep said predetermined filter, then data of said predetermined filter are stored in association with data acquired from the learning visual environment in a filter database assigned to said wearer, if said choice input is to adjust said predetermined filter, said predetermined filter is modified according to the learning visual environment and the above operations are repeated with the thus adjusted filter as a new predetermined filter.

In an embodiment, the method comprises further:

providing a filter database assigned to said wearer and storing data of prerecorded filters respectively associated with data acquired from a plurality of learning visual environments, and wherein said selecting of at least one filter to be applied by the electrically commanded cell comprises:

comparing data acquired from said least one predetermined type of visual environment successively to said data acquired from a plurality of learning visual environments, finding in the database data acquired from a learning visual environment which are the closest to said data acquired from said least one predetermined type of visual environment, and selecting from said database data of the prerecorded filter associated with said data of the learning visual environment which are the closest to said data acquired from said least one predetermined type of visual environment.

In an embodiment, the selecting of at least one filter is implemented by maximizing estimated performance parameters, and wherein said estimated performance parameters comprise at least one of color fidelity parameters and contrast parameters of said least one predetermined type of visual environment of the wearer.

Therefore, the selected filter may enhance the color and contrast perception of the wearer according to his preferences. For instance such performance parameters may relate to increased chroma, hue or lightness.

In an embodiment, the said at least one sensor comprises a camera to acquire at least one current image comprising a multiplicity of successive lines, light signal in each band of wavelength and in each line of said current image is measured to generate a matrix of spatial and spectral data corresponding to said multispectral and/or hyper spectral data.

Therefore, such camera may for instance be mounted on a rotating head so the visual environment may be scanned line by line.

In an embodiment, the ophthalmic device comprises a wireless communication module arranged to communicate wirelessly with at least one wireless communication device.

Therefore, the ophthalmic device may be able to access information thanks to one or several wireless device. Such information may or may not directly relate to the wearer. For example, the wearer may have entered information in an application on his mobile device and the ophthalmic device may access such information using wireless communication. Another example may be that the ophthalmic device may have directly access to a network or data base that is accessible from the wireless communication device itself.

Another aspect of the invention relates to an ophthalmic device for selecting an optical filtration for a wearer, the ophthalmic device comprising means for:

obtaining wearer's preferences relatively to at least one predetermined type of visual environment comprising multispectral or hyper spectral data;

selecting at least one filter:

corresponding to said wearer's preferences relatively to said at least one predetermined type of visual environment, and determined on the basis of said multispectral or hyper spectral data.

Other features and advantages of the method and device disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE PREFERRED EMBODIMENTS

The invention relates to a method for filter selection that may take into account two types of data:
data relating to the wearer, such as wearer's activities or wearer spectral sensitivity for example.
data relating to the visual environment of the wearer, such as spectral measurement of the colors for example.

The data relating to the wearer can be obtained through several manners. For instance, a first manner of obtaining data relating to the wearer may be a questionnaire that the wearer may be asked to fill out. Such questionnaire may request what color the wearer prefers or what color the wearer would like to have enhanced. The wearer may be questioned regarding the type of activities he practices and what are the occurrences of such activities. For example, a wearer may indicate in such questionnaire, the time he allocates to driving, sports, being home or at the office.

Another manner to collect data relating to the wearer may be performing measurement on the wearer. For example, such measurement may indicate any colorblindness of the wearer and the state of his normal color vision. A measurement regarding the spectral sensitivity of the wearer may be required.

Data relating to the visual environment of the wearer may indicate for example what are the most important or dominant colors of the visual environment and the spatial distribution of the color. The visual environment of the wearer may be segmented and scene or activity recognition may be performed. Such segmentation may be performed according to the most important object of the visual environment of the wearer.

TABLE 1

Based on data relating to the wearer and data relating to the visual environment of the wearer, a filter or several filters that suit best the wearer may be selected.

| Wearer's Data | |
|---|---|
| Questionnaire | Measurements |
| Driving | Normal Color |
| Sport | Vision |
| Office | Color Blindness |
| Home | UV Sensibility |
| Visual Environment Data | |
| spectral data (multi/hyper) | color gamut |
| scene/activity recognition | segmentation of environment |
| sky | water |
| vegetation | roadway |
| skin | snow |
| RESULT | |
| Filter 1 | Filter 2 |
| Filter 3 | Filter 4 |

Figure 1A:
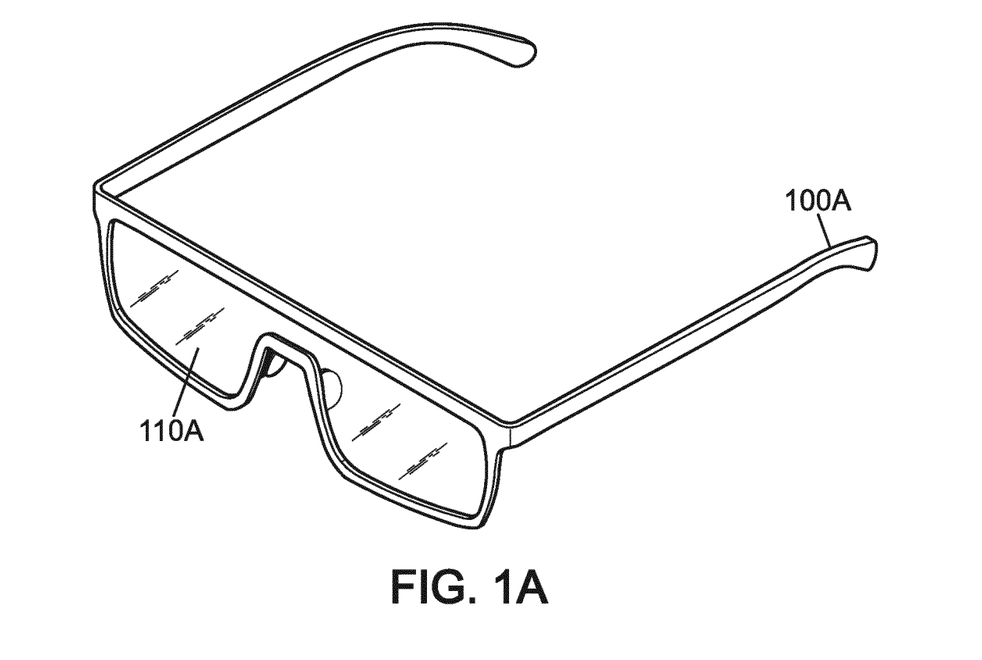
FIG. 1A is an example of an ophthalmic device for a wearer according to a possible embodiment of the present invention.

FIG. 1A is an example of an ophthalmic device for a wearer according to a possible embodiment of the present invention.

An ophthalmic device 100A is represented with an optical filter 110A applied. Such filter 110A has been selected based on wearer's preference relating to one or several visual environments and multi spectral or hyper spectral data associated. For example, such ophthalmic device 100A may have been selected for a wearer of a certain age spending most of this time practicing outdoor activities such as skiing.

Based on his activities, the wearer may have decided to acquire such ophthalmic device 100A with such filter 110A applied. The wearer may have walked in an ophthalmic device store and filled out a questionnaire indicating his habits and preferences. Measurements of his spectral sensitivity may have been performed. As such wearer may have indicate that his intention is to obtain a filter to practice ski, multispectral or hyper spectral data regarding ski environments may have been pulled out from a data base. Such data base may contain multi spectral or hyper spectral data regarding different type of visual environment.

In order for the wearer to acquire the ophthalmic device 100A with such filter 110A applied; the wearer may also have recorded himself the multispectral or hyper spectral data regarding ski visual environments. For example, the wearer may have brought a multispectral or hyper spectral sensor in his sky practices so the sensor may record multispectral or hyper spectral data according to his specific ski visual environment. After such recording, the wearer may have gone to an ophthalmic device store to provide the multispectral or hyper spectral data that have been recorded so the most adapted filter to the wearer and the recorded multispectral or hyper spectral data may be selected.

Acquiring multispectral or hyper spectral data may enable to precisely determinate the spectral distribution of each pixel. For this reason, multispectral or hyper spectral imaging systems allow a quick acquisition of spectral information at each point of a visual environment.

Figure 1B:
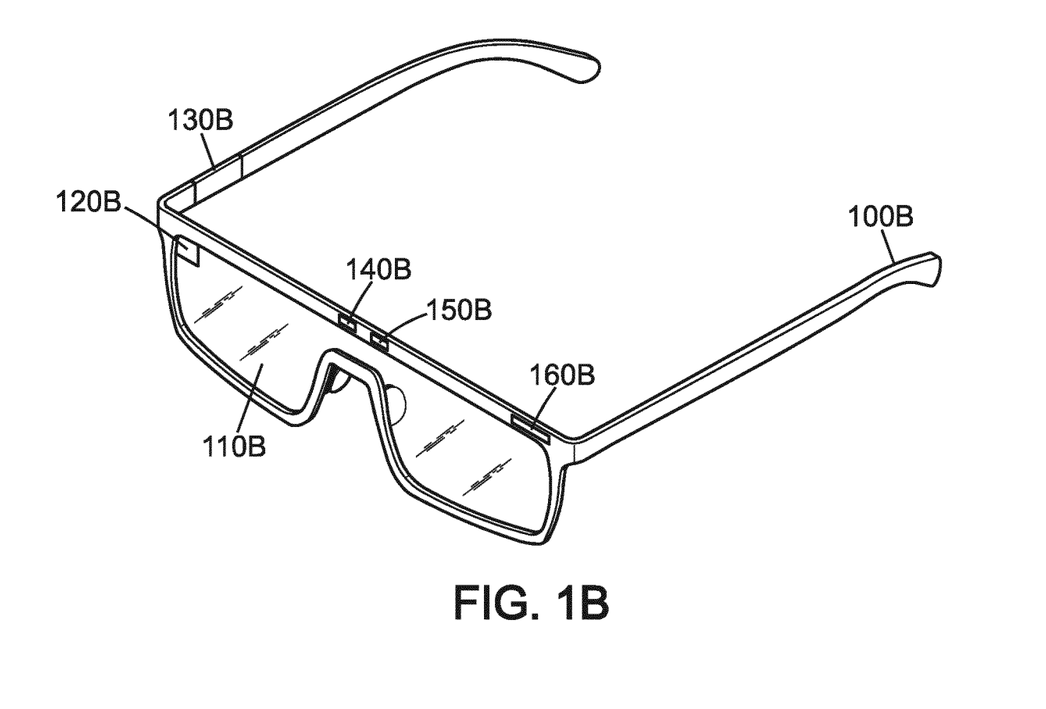
FIG. 1B is an example of an ophthalmic device for a wearer according to a possible embodiment of the present invention.

FIG. 1B is an example of an ophthalmic device for a wearer according to a possible embodiment of the present invention.

An ophthalmic device 100B is represented with an optical filter 110B applied. Such ophthalmic device 100B comprises a battery 130B, a memory 140B, a central processing unit 150B, a sensor 160B and a command 120B to command an electrically commanded cell in order to apply an optical filter. In this possible embodiment of the present invention, the sensor 160B may be able to acquire multispectral or hyper spectral data of the visual environment of the wearer. For example, for a wearer wearing the ophthalmic device 100B in a forest visual environment, the sensor 160B may acquire multispectral or hyper spectral data of the forest visual environment. Such multispectral or hyper spectral data of the forest may be memorized in the memory 140B for further use for instance. Such multispectral or hyper spectral data of the forest may be processed by the central processing unit 150B so an electric command 120B may be generated so the filter 110B may be applied. With ophthalmic device 100B, the wearer may be able to record the multispectral or hyper spectral data of different environment and such multispectral or hyper spectral data may be used to select different filters according to the environment of the wearer.

Figure 2A:
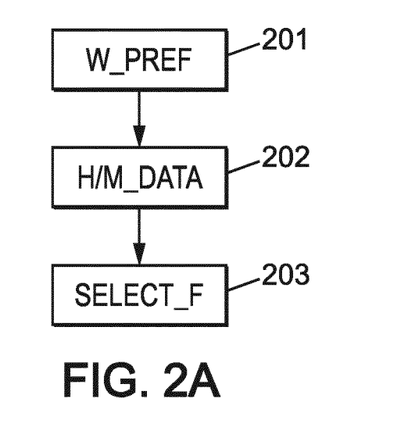
FIG. 2A is a flow chart illustrating the different steps of the optical filtration selecting method in a possible embodiment of the present invention.

FIG. 2A is a flow chart illustrating the different steps of the optical filtration selection method in a possible embodiment of the present invention.

In step 201, wearer's preferences relatively to at least one predetermined visual environment defined by multispectral or hyper spectral data are obtained. Such multispectral or hyper spectral data may be obtained from a database. For example, the wearer may have access to such database through a computer located in an ophthalmic device store. Such multispectral or hyper spectral data may also be obtained through a sensor or camera acquisition that may be performed by the wearer or a third person. In step 202, such multispectral or hyper spectral data relatively to at least one predetermined type of visual environment are used so at least one filter may be selected in step 203.

Figure 2B:
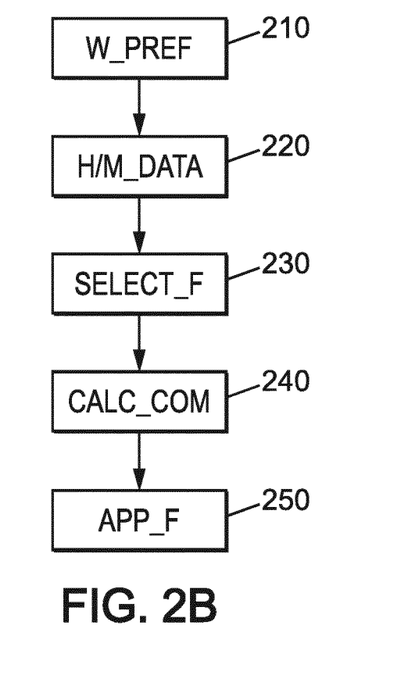
FIG. 2B is a flow chart illustrating the different steps of the optical filtration selecting method in a possible embodiment of the present invention.

FIG. 2B is a flow chart illustrating the different steps of the optical filtration selection method in a possible embodiment of the present invention.

In step 210, wearer's preferences relatively to at least one predetermined visual environment defined by multispectral or hyper spectral data are obtained. In step 220, such multispectral or hyper spectral data relatively to at least one predetermined type of visual environment are used so at least one filter can be selected in step 230. In step 240, an electrically command is calculated so an electrically commanded cell may apply the selected filter in step 250.

Figure 3A:
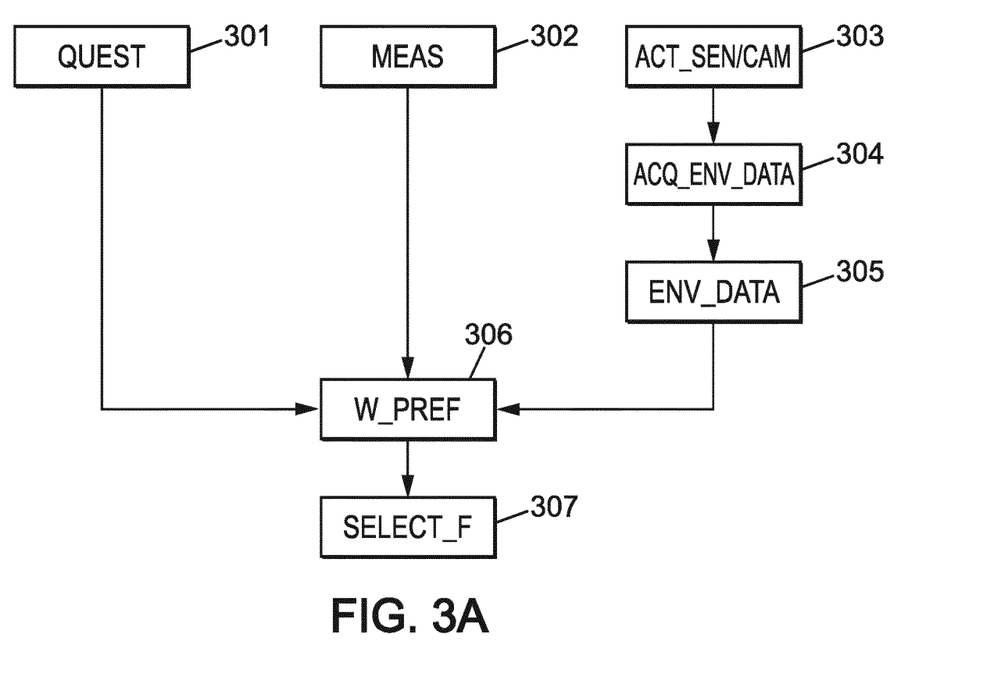
FIG. 3A is a flow chart illustrating the different steps of the optical filtration selecting method in a possible embodiment of the present invention.

FIG. 3A is a flow chart illustrating the different steps of the optical filtration selection method in a possible embodiment of the present invention.

In step 301, the wearer may fill out a questionnaire regarding his daily life and the time he allocates to different activities. For example, the wearer may indicate he practices golf every Saturday and that from Monday to Friday he may be in his office seated in front of a computer screen. Measurement may be performed in step 302 on the wearer, such measurement may relate to the spectral sensitivity of the wearer: normal color vision or dyschromatopsia, individual S, M and L curves and lens opacification. In step 303 a sensor or a camera may be activated so data relating to the visual environment of the wearer may be captured and acquired in step 304. Such visual environment data may comprise multispectral or hyper spectral measurements of the natural colors of the visual environment of the wearer. The visual environment data may also enable to determine the most important colors and the spectral distribution of the colors of the visual environment of the wearer. During such acquisition of the visual environment data, the camera may be able to perform pattern recognition on the environment of the wearer so the environment of the wearer may be segmented by color categories and by elements: sky, water, vegetation, roadway, skin or snow. Visual environment data of the wearer may be gathered and analyzed in step 305 and so may wearer's preferences in step 306. In step 307, the most adapted filter may be selected. During such step 307, color metrics may be calculated and protection against ultraviolet, blue and infrared light may be taken into account.

Figure 3B:
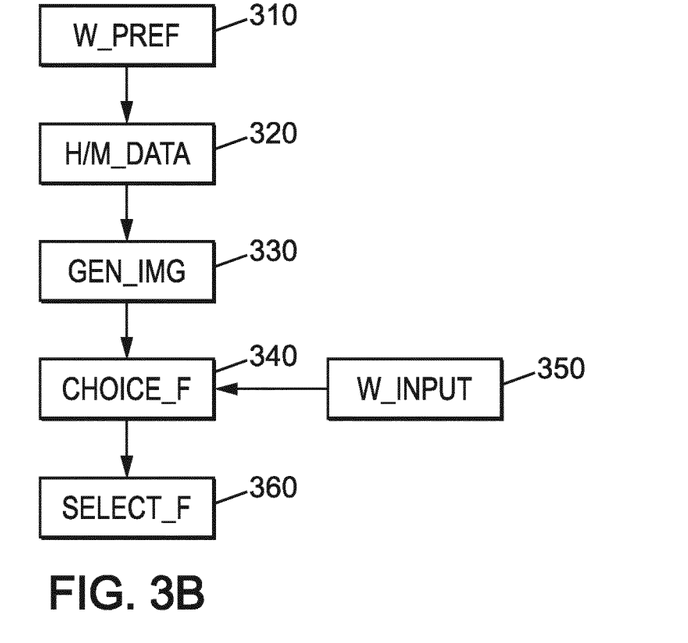
FIG. 3B is a flow chart illustrating the different steps of the optical filtration selecting method in a possible embodiment of the present invention.

FIG. 3B is a flow chart illustrating the different steps of the optical filtration selection method in a possible embodiment of the present invention.

In step 310, wearer's preferences relatively to at least one predetermined visual environment defined by multispectral or hyper spectral data are obtained. In step 320, such multispectral or hyper spectral data relatively to at least one predetermined type of visual environment are processed so images can be generated in step 330. Such generated images in step 330 represent at least one predetermined type of visual environment of the wearer with at least one filter applied. At step 340, a choice of several filters may be suggested to the wearer. Based on his preferences, the wearer may provide an input to validate such suggested filter in step 350. Following such user input in step 350, the most adapted filter according to the wearer input may be selected in step 360.

Figure 4:
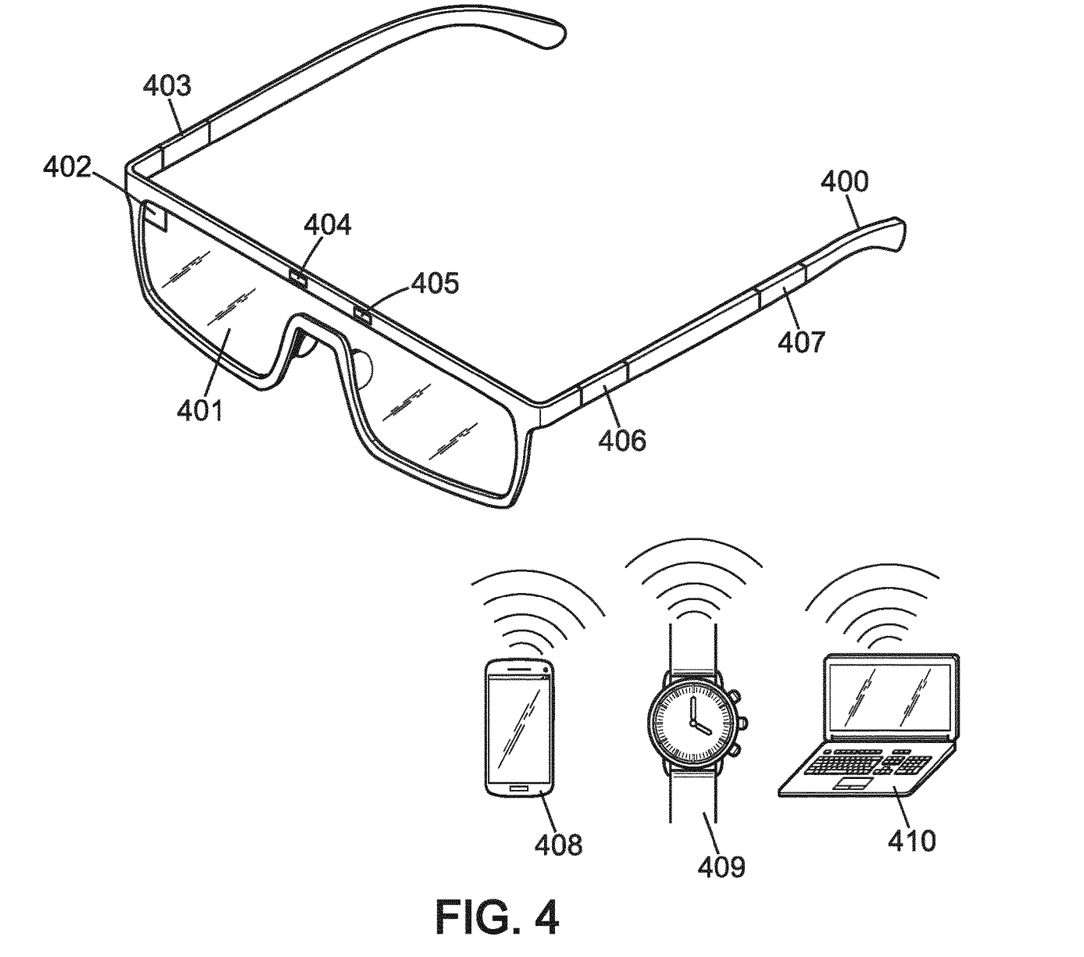
FIG. 4 is an example of an ophthalmic device for a wearer according to a possible embodiment of the present invention.

FIG. 4 is an example of an ophthalmic device for a wearer according to a possible embodiment of the present invention;

An ophthalmic device 400 is represented with an optical filter 401 applied. The ophthalmic device 400 comprises a battery 403, a memory 404, a central processing unit 405 and a command 402. The ophthalmic device 400 further comprises a wireless communication module 406 and a bluetooth module 407. Such modules 406 and 407 enable the ophthalmic device to communicate wirelessly with external devices 408, 409 and 410. The external devices 408, 409 and 410 respectively represent a mobile phone, a connected watch and a computer. In this possible embodiment of the present invention, multispectral or hyper spectral data of the environment of the wearer may be provided by the external devices 408, 409 and 410. Such external devices may be equipped with sensors or cameras. In such cases, sensors embedded in any external devices may be able to perform a spectral capture of the environment of the wearer so a map of spectral data may be provided.

Figure 5:
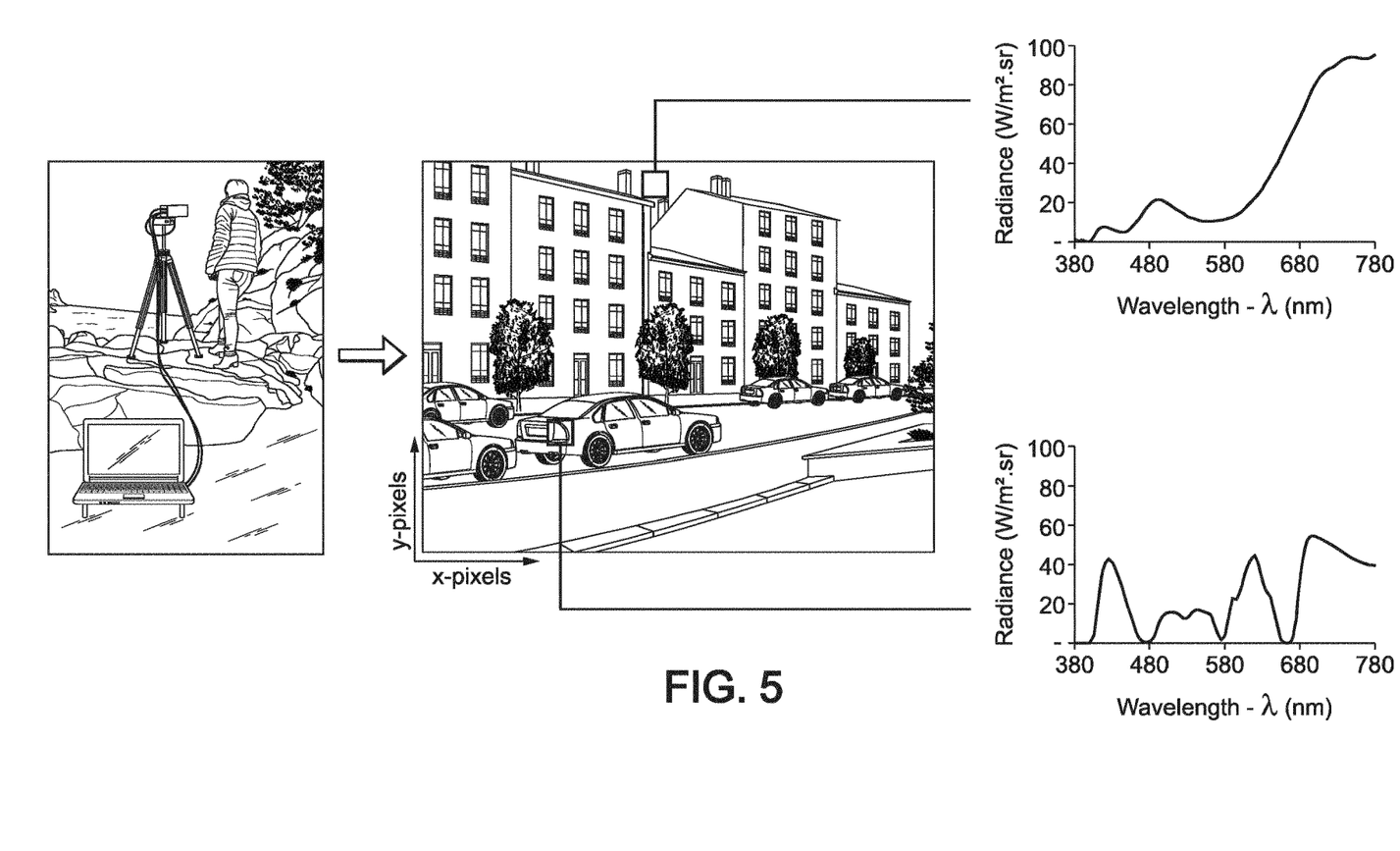
FIG. 5 represents an example of information available in a hyper spectral image.

FIG. 5 represents an example of information available in a hyper spectral image.

FIG. 5 illustrates an example of acquisition of hyper spectral data of a scene with a hyper spectral data acquisition equipment. Such equipment provides a hyper spectral image as illustrated in FIG. 5. Based on the hyper spectral image, radiance of different elements of the hyper spectral image may be extracted. As an example, on FIG. 5, radiance of the sky and radiance of a rear vehicle light are extracted from the hyper spectral image and both radiances are represented in function of the wavelength. It may clearly be noticed that the radiance of the sky in function of the wavelength differs from the radiance of the rear vehicle light in function of the wavelength. As a result of the calibration of the hyper spectral acquisition equipment, the radiance and reflectance spectral distributions may be determined.

The hyper spectral data acquisition equipment represented on FIG. 5 is a scan equipment that may be mounted on a rotating head. Such equipment enables to scan the scene. Further details regarding the different means of hyper spectral data acquisition are provided below.

Figure 6:
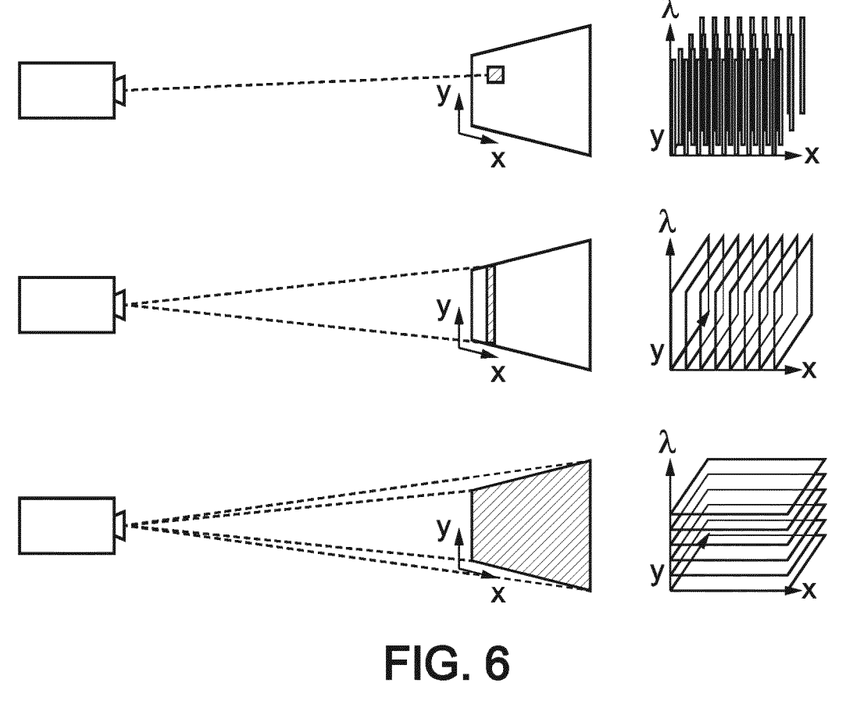
FIG. 6 represents an example of hyper spectral techniques.

FIG. 6 represents an example of hyper spectral techniques.

Hyper spectral images may be generated by three different means: point scanning, line scanning and wavelength scanning. On FIG. 6, the first means to be represented, from top to bottom is the point scanning. Regarding the point scanning, for all wavelengths, the scene is scanned point by point along two axes. The light scanning differs, indeed, for all wavelengths; the scene is scanned line by line along one axis. Finally, for the wavelength scanning, the entire scene is acquired at a single wavelength at a time. For each scan, a CCD (Charge Couple Device) camera sensor may record a signal. Afterwards, such signal may be transformed to radiance as a result of a calibration. The result may be a x-by-y-by-n matrix combining two spatial dimensions (x and y, the pixel size of the picture) and one spectral dimension (n, the number of recorded wavelength). Such matrix is obtained despite the type of hyper spectral technique performed: point scanning, line scanning or wavelength scanning.

A hyper spectral camera may be able to record at least the entire visible light spectrum going from about 380 nm to about 780 nm. The resolution of a hyper spectral camera may be from about 1 nm to about 10 nm. The resolution may be greater than 10 nm, however it may reduce the accuracy. Such hyper spectral camera may be able to record ultraviolet or infrared light so daily level of exposure may be assessed. Such spectral data may be captured by a CCD or a CMOS (complementary metal-oxyde semiconductor) sensor, a camera, a spectrophotometer, any device that provides a map of spectral data.

Figure 7:
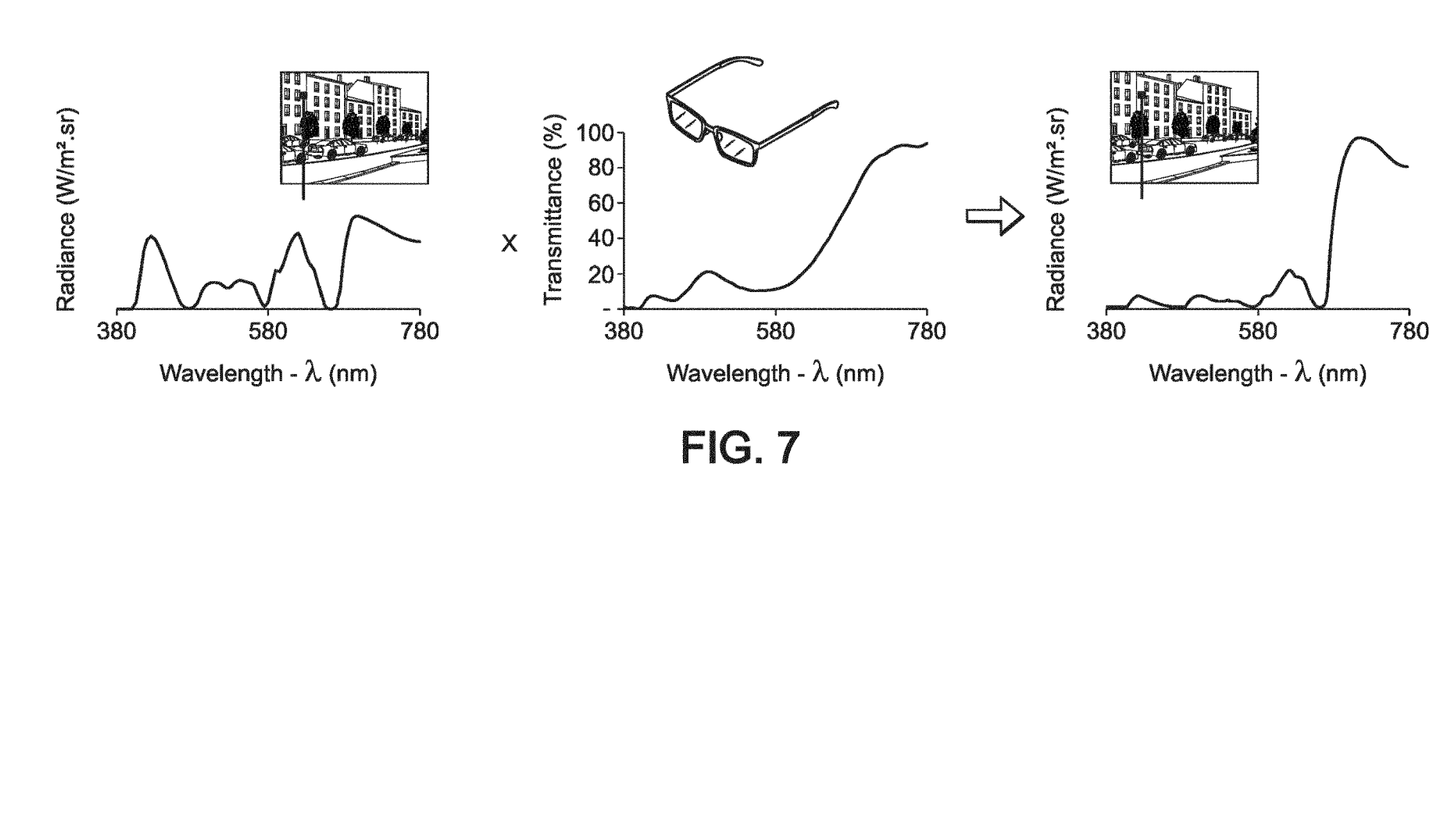
FIG. 7 represents an example of lens transmittance applied to an acquired spectral distribution.

FIG. 7 represents an example of lens transmittance applied to an acquired spectral distribution.

FIG. 7 represents three different types of graphics from left to right. The first graphic represents the original radiance spectrum of one pixel of a visual environment in function of the wavelength. The second graphic represents the transmittance spectrum of one filter which may be a tinted lens in function of the wavelength. Finally, the third graphic represents the distorted radiance in function of the wavelength. The distorted radiance corresponds to the original radiance of the selected pixel of the visual environment when the transmittance spectrum of the filter has been applied. Such distorted radiance allows studying the impact of the filter on the colors of the visual environment of the wearer.

For this purpose, in order to apply optical filters to hyper spectral images and study their impact, a RGB (Red Green Blue) picture may be generated. Such RGB picture may represent a visual environment viewed by a wearer wearing an ophthalmic device with a filter applied. Different metrics may be generated; such metrics may describe the color shift resulting from the application of the filter on a visual environment. A metric relating to the appropriateness of the filter may also be created. Such appropriateness metric may take into account the preferences of the wearer, his activity and characteristic concerning his physiology for example.

The acquisition of multispectral or hyper spectral data enables to calculate the effect of a filter on a specific visual environment. For example, hyper spectral data of a visual environment representing a dense forest may be acquired so calculation regarding the application of several filters applied to such visual environment may be performed. To this end, a database comprising filters and associated color metrics values such as fidelity, chroma enhancement, hue shift may be constituted. Such filters database may be used by an eye care professional in order to show a wearer the effect of certain filters. For example, an eye care professional may be able to display to a wearer who practices regularly golf the effect of a selected filter for a golf visual environment. As a result, the wearer may better apprehend the effect of a filter for a visual environment that he is accustomed to.

Figure 8:
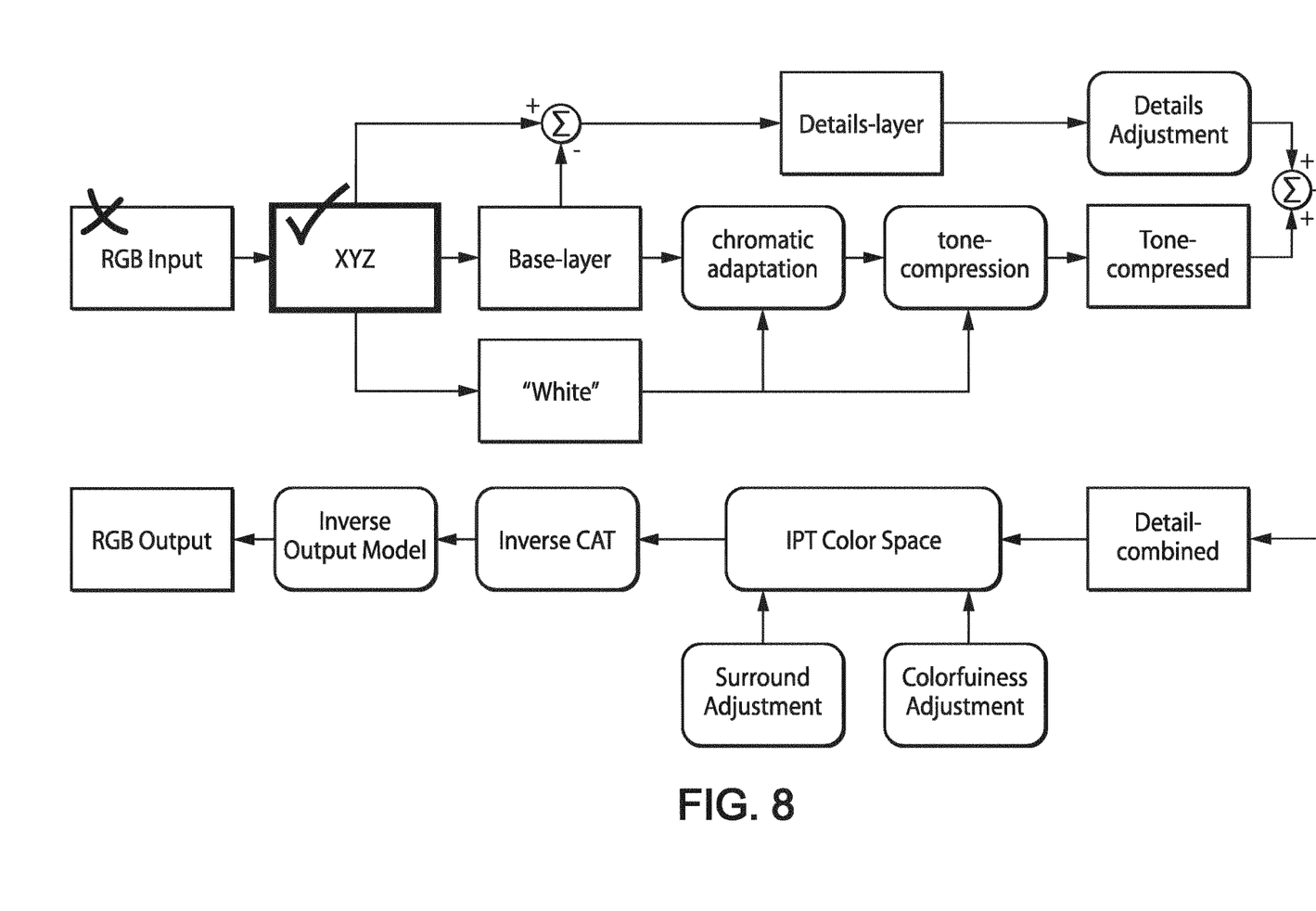
FIG. 8 represents an example of flow chart of a color appearance model.

FIG. 8 represents an example of flow chart of a color appearance model.

A color model (e.g. CIEXYZ, CIELab . . . ) or a color appearance model (CAM, e.g. CIECAM02, iCAM) may be used in the process of generating an RGB picture based on acquired multispectral or hyper spectral data of a visual environment. Firstly, for each pixels of a visual environment there is a need to transform the radiances in function of the wavelength in tristimulus values such as for example XYZ, XYZ 10°, XYZ based on the fundamental or LMS. This transformation may be performed in order to consider the sensitivity of the human eye. The curves of the spectral sensitivity of the standard wearer may be changed by the specific sensitivity of the wearer. A color appearance model as illustrated on FIG. 8 may be applied so the influence of the viewing conditions on the perception of colors, light and dark adaptation and chromatic adaptation or other perceptual effect, such as the Bartleson effect, may be better taken into account. As illustrated on FIG. 8, a tone mapper could then be applied to adapt the large range of luminance of a visual environment to the luminance that is displayable on a device such as a computer screen or a mobile device screen for example. As a result, the resulting image displayed on a device that has been correctly calibrated may represent the colors experience of the visual environment.

In a color shift analysis the first two steps that may be taken into account are the sensitivity of the human eye in calculating tristimulus values and the application of a color appearance model. The sensitivity of the human eye may be replaced by the specific spectral sensitivity of the wearer, according to his age or color deficiency. The color shift may be then studied in a color space and for example in the IPT opponent color space. The IPT color space may currently represent the most perceptually uniform color space. However, any other color space may be used. Color shift may be evaluated by analyzing the color temperature shift, chroma enhancement, hue shift and fidelity. The calculation of the metrics may be performed on the entire picture, on the most important elements and by color categories. The aim of the objective analysis is to determine the impact of a filter on the perception of colors.

Similarly to CIE $\Delta E^*ab$, $\Delta Im$ is a euclidian distance. It may be noticed here that many color differences can be calculated. The $\Delta Im$ distance is calculated in the IPT color space and the formula is:

$$\Delta Im = \sqrt{(I_{orig} - I_{dist})^2 + (P_{orig} - P_{dist})^2 + (T_{orig} - T_{dist})^2}$$

In order to evaluate the color difference over the visual environment, the method commonly used is to average pixel-by-pixel color difference. Like other reviewed indices, iPT color difference index is a fidelity index.

Such index provides information regarding the global distortion between an image and a reference. However, a visual environment perceived through a filter such as for example tinted lenses may not be faithful to the original visual environment. For this reason, the visual environment perceived through the filter may be close to the original visual environment or may be perceived similarly by the wearer or even, be preferred by the wearer. To fully understand wearer preferences, it may be necessary to gain knowledge about the characteristics of the difference such as a loss of saturation, a hue distortion, affecting one or many hues. For this purpose the CAM overall color difference index may be complemented by other indicators. The CAM color difference index Δlm may first be calculated between each distorted image and the original one. The global information may be complemented given by the Δlm value with a color map of Δlm which pinpoints where differences may be located in the visual environment. Δlm may finally be computed for some dominant elements of the scene.

In order to provide a better understanding of hue shift, polar histograms of hues may be plotted in the PT plane. Such polar histograms of hues inform on the dominant colors of a visual environment, and the comparison between each distorted visual environment and the original visual environment may provide information relating to the hue shift.

Polar histograms may enable to highlight the fact that, for example in the original visual environment, a large number of pixels may be green-yellow. The comparison between two graphs with the same scale enables to analyze the color shift. For instance, it may be observed that between an original image and a distorted image, the number of green-yellow pixels decreases without hue shift and the number of blue pixels increases. Another example may that between the original image and another distorted image, it may be analyzed that the number of green-yellow pixel decreases and that there may be a hue shift toward the orange.

The definition of the most important color may differ according to the preferences and activities of the wearer.

Concerning color shift, hue shift and chroma shift may be proposed to be analyzed in comparing: mean hue/chroma of an original image to those of an distorted image, mean hue/chroma of each element of each image and mean hue/chroma for each color bin.

Color shift may be analyzed by category of color. This representation enables to analyze how each type of color present in the visual environment may be modified according to the filter.

As a consequence, a color fidelity index, a color gamut index, a hue shift and a color shift index may be obtained for the overall visual environment or specific colors or groups of colors.

Figure 9:
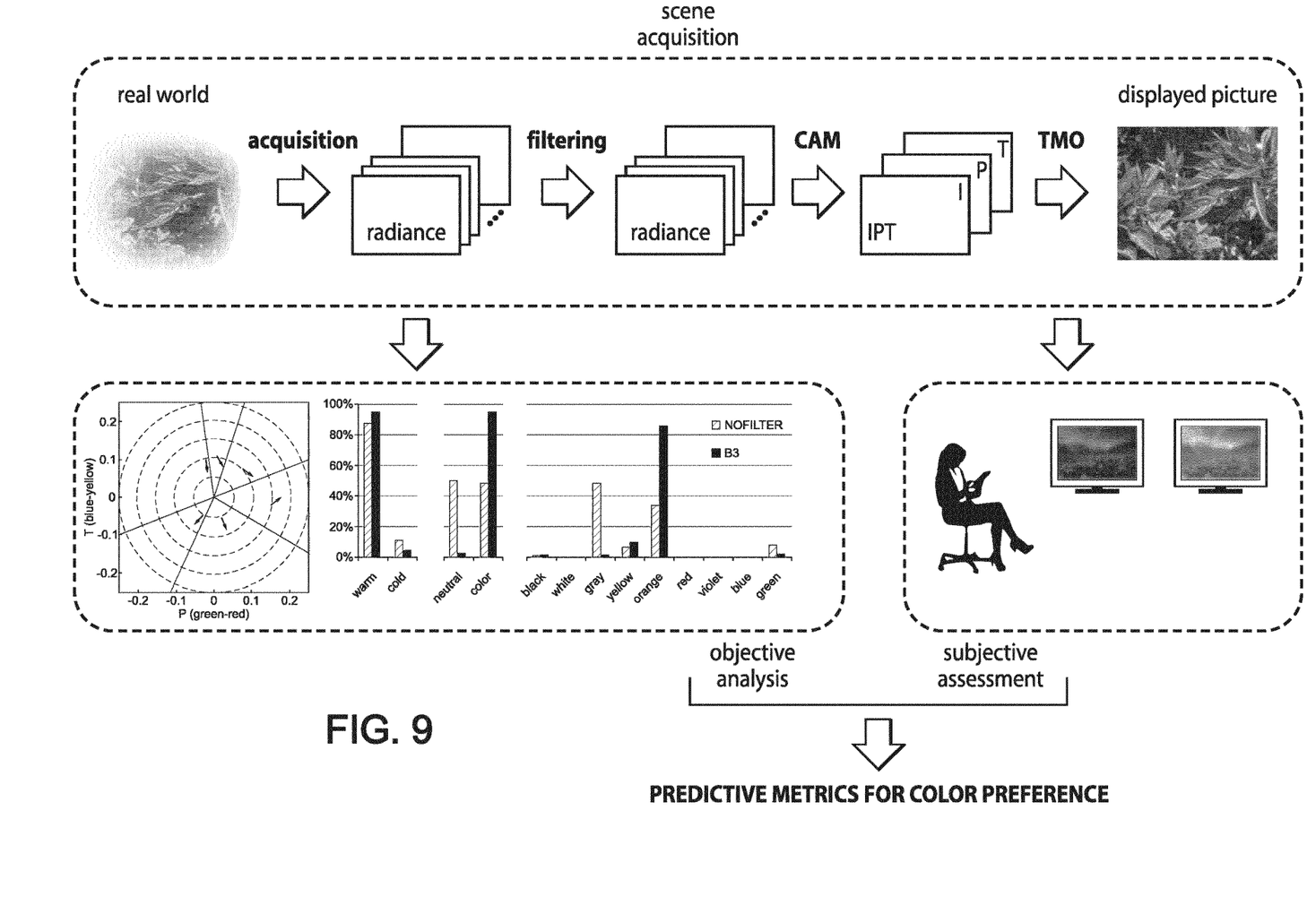
FIG. 9 represents an example of determination of predictive metrics for color preference.

FIG. 9 represents an example of determination of predictive metrics for color preference.

Regarding color preferences, a metric for appropriateness may be used as the correlation between metrics for color shift and wearer preferences collected through psychovisual tests.

Therefore the visual environment or scene is acquired, a filter is applied to the radiance obtained then a color appearance model and tone mapping operator are applied in order to produce the RGB picture or displayed picture. Such picture may be used so the wearer may assess subjectively the effect of the filter. Therefore, the visual environment or scene acquisition results in both an objective analysis and a subjective assessment. As a result predictive metrics for color preference may be generated.

Figure 10:
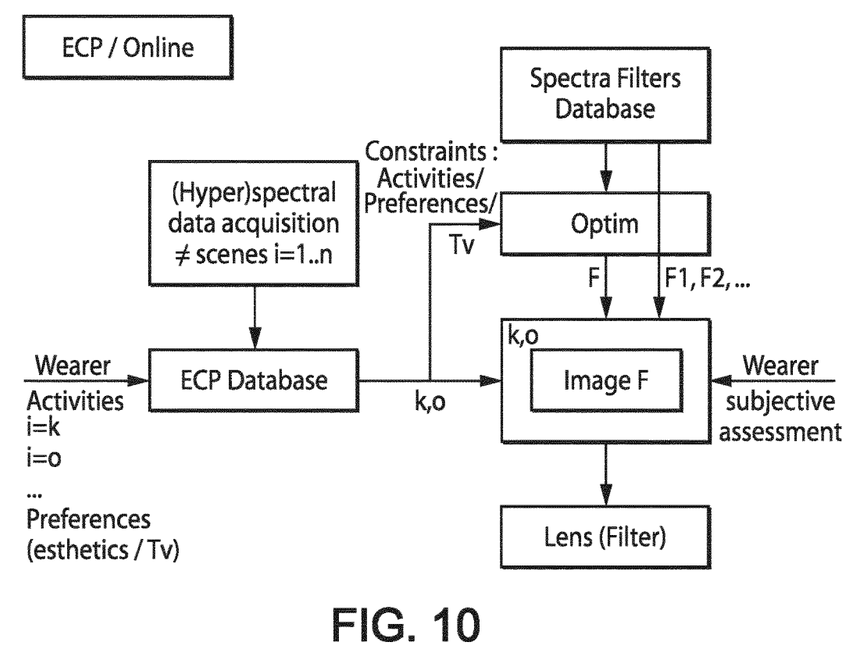
FIG. 10 represents an example of scenario for an eye care professional.

FIG. 10 represents an example of scenario for an eye care professional.

Hyper spectral or multi spectral data of a visual environment are acquired and may be stored in an eye care professional (ECP) data base. Wearer activities and wearers preferences may be stored as well in such database. Wearer's activities may comprise specific characteristics, important colors and object of several visual environments. An image may be generated so the wearer may be able to assess the effect of filter and provides his approval. A spectral filter database may be presented in an application or physical filters may be directly tested by the wearer. From an application, the selected filters may be simulated on a screen such as a computer screen or a mobile device screen. Without any filter database, the process may predict a theoretical filter that may fit the requirements defined by the wearer.

Figure 11:
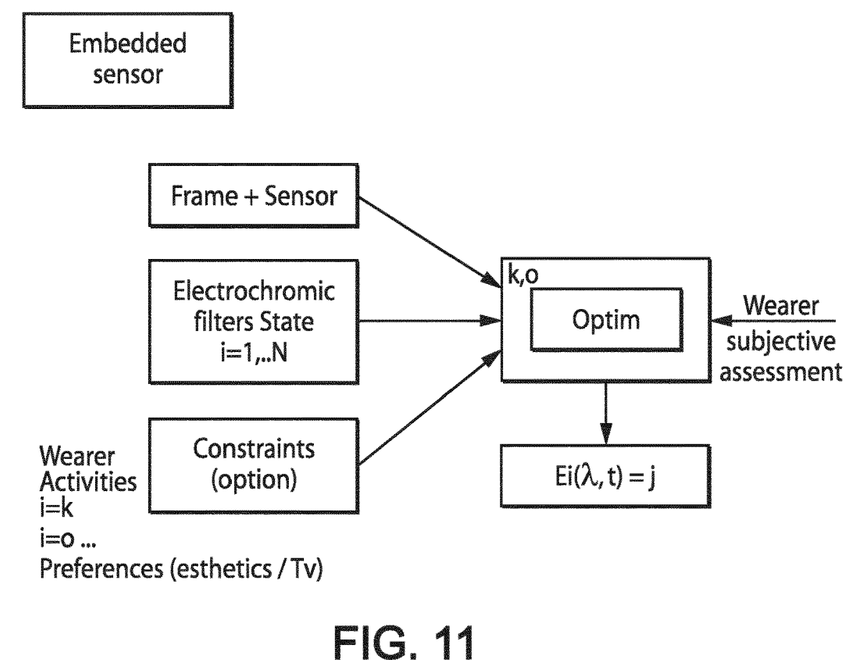
FIG. 11 represents an example of scenario for electro chromic filters.

FIG. 11 represents an example of scenario for electro chromic filter.

A sensor may be embedded in a frame of an ophthalmic device for instance. For this reason the selection of filter may be processed for every change of visual environment. For instance a filter may be selected and applied for a wearer wearing an ophthalmic device practicing ski. When such wearer goes back to his housing to be seated in front of a computer, the filter may change as the sensor may have the sense the change of visual environment. Such filter change may even be performed in real time. The electro chromic filter may adapt its spectral transmission in real time according to the change of visual environment. The sensor may be embedded in any type of external device such as a mobile phone or a connected watch.

Of course, the present invention is not limited to the embodiments described above as examples. It extends to other variants.

The invention claimed is:

1. A method implemented by computer means of selecting an optical filtration of an ophthalmic device for a wearer, the method comprising:
obtaining wearer's preferences relative to at least one predetermined type of visual environment and taking multispectral or hyper spectral data relative to the wearer's preferences; and
selecting at least one filter:
corresponding to said wearer's preferences relative to said at least one predetermined type of visual environment, and
determined on the basis of said multispectral or hyper spectral data,
wherein said obtained wearer's preferences are obtained by at least one sensor configured to sense environment light signals; and
wherein said at least one sensor comprises a camera to acquire at least one current image comprising a multiplicity of successive lines, light signals in each band of wavelength, and in each line of said current image being measured, to generate a matrix of spatial and spectral data corresponding to same multispectral and/or hyper spectral data.

2. The method according to claim 1, wherein said selecting of at least one filter takes into account the spectral sensitivity of the wearer.

3. The method according to claim 1, wherein said ophthalmic device comprises an electrically commanded cell, and wherein the method further comprises commanding said electrically commanded cell to apply said selected filter.

4. The method according to claim 1, wherein the method further comprises:
generating images representing said at least one predetermined type of visual environment of the wearer with said at least one filter applied; and
receiving a wearer input to validate based on said generated images said at least one filter selected.

5. The method according to claim 4, wherein said generated images are displayed on a RGB (Red Green Blue) color display, and wherein said generated images are further based on spectral transmission of said at least one filter applied and on said multispectral or hyper spectral data.

6. The method according to claim 1, wherein said at least one sensor configured to sense environment light signals is embedded in an external device or in said ophthalmic device.

7. The method according to claim 1, wherein said at least one sensor comprises a camera and said selecting of the at least one filter comprises a predetermined pattern recognition and a selection of an adapted filtration to be applied to images acquired by the camera comprising said predetermined pattern.

8. The method according to claim 1, wherein said obtained wearer's preferences are obtained in real time.

9. The method according to claim 3, wherein the ophthalmic device comprises a connection to a user interface, wherein said wearer's preferences comprise data input by the wearer through said user interface when the wearer wears the ophthalmic device and is within a learning visual environment, and wherein said obtaining wearer's preferences comprises:
according to said learning visual environment, commanding the cell to apply a predetermined filter;
activating said user interface to receive from the wearer a choice input of keeping or adjusting the predetermined filter;
if said choice input is to keep said predetermined filter, storing the data of said predetermined filter in association with data acquired from the learning visual environment in a filter database assigned to said wearer; and
if said choice input is to adjust said predetermined filter, modifying the predetermined filter according to the learning visual environment and the above operations are repeated with the thus adjusted filter as a new predetermined filter.

10. The method according to claim 3, further comprising:
providing a filter database assigned to said wearer and storing data of prerecorded filters respectively associated with data acquired from a plurality of learning visual environments;
wherein said selecting of at least one filter to be applied by the electrically commanded cell comprises:
comparing data acquired from said at least one predetermined type of visual environment successively to said data acquired from a plurality of learning visual environments;
finding in the database data acquired from a learning visual environment which are the closest to said data acquired from said least one predetermined type of visual environment; and
selecting from said database data of the prerecorded filter associated with said data of the learning visual environment which are the closest to said data acquired from said least one predetermined type of visual environment.

11. The method according to claim 1, wherein said selecting of at least one filter is implemented by maximizing estimated performance parameters, and wherein said estimated performance parameters comprise at least one of color fidelity parameters and contrast parameters of said least one predetermined type of visual environment of the wearer.

12. The method according to claim 1, wherein said ophthalmic device comprises a wireless communication module arranged to communicate wirelessly with at least one wireless communication device.

13. An ophthalmic device for selecting an optical filtration for a wearer, the ophthalmic device comprising means for:
obtaining wearer's preferences relative to at least one predetermined type of visual environment and taking multispectral or hyper spectral data relative to the wearer's preferences; and
selecting at least one filter:
corresponding to said wearer's preferences relative to said at least one predetermined type of visual environment, and
determined on the basis of said multispectral or hyper spectral data,
wherein said obtained wearer's preferences are obtained by at least one sensor configured to sense environment light signals; and
wherein said at least one sensor comprises a camera to acquire at least one current image comprising a multiplicity of successive lines, light signals in each band of wavelength, and in each line of said current image being measured, to generate a matrix of spatial and spectral data corresponding to same multispectral and/or hyper spectral data.

\* \* \* \* \*